(12) United States Patent
Oya et al.

(10) Patent No.: US 10,814,486 B2
(45) Date of Patent: Oct. 27, 2020

(54) INFORMATION PROCESSING DEVICE, INFORMATION PROCESSING METHOD, AND NON-TRANSITORY COMPUTER-READABLE RECORDING MEDIUM

(71) Applicant: OMRON Corporation, Kyoto (JP)

(72) Inventors: Taku Oya, Kyoto (JP); Haruna Shimakawa, Kyoto (JP)

(73) Assignee: OMRON Corporation, Kyoto (JP)

( * ) Notice: Subject to any disclaimer, the term of this patent is extended or adjusted under 35 U.S.C. 154(b) by 390 days.

(21) Appl. No.: 15/891,344

(22) Filed: Feb. 7, 2018

(65) Prior Publication Data

US 2019/0047146 A1 Feb. 14, 2019

(30) Foreign Application Priority Data

Aug. 10, 2017 (JP) ................................. 2017-154935

(51) Int. Cl.
| | |
|---|---|
| *B25J 9/16* | (2006.01) |
| *G05B 19/042* | (2006.01) |
| *G05B 19/05* | (2006.01) |
| *B25J 9/00* | (2006.01) |
| *B25J 9/04* | (2006.01) |

(52) U.S. Cl.
CPC .......... *B25J 9/1671* (2013.01); *B25J 9/0096* (2013.01); *B25J 9/042* (2013.01); *G05B 19/0426* (2013.01); *G05B 19/054* (2013.01); *G05B 19/056* (2013.01); *G05B 2219/1105* (2013.01); *G05B 2219/13134* (2013.01); *G05B 2219/13176* (2013.01); *G05B 2219/13186* (2013.01);

(Continued)

(58) Field of Classification Search
CPC ....................................................... B25J 9/1671
USPC ............................................................ 703/23
See application file for complete search history.

(56) References Cited

U.S. PATENT DOCUMENTS

| | | | |
|---|---|---|---|
| 2002/0054098 A1* | 5/2002 | Schmitt ............... | G05B 19/056 715/762 |
| 2013/0218307 A1 | 8/2013 | Hoernicke et al. | |
| 2016/0033952 A1* | 2/2016 | Schroeter ......... | G05B 19/41885 700/108 |

FOREIGN PATENT DOCUMENTS

JP 2016-042378 3/2016

OTHER PUBLICATIONS

Gears_2015 (Gears, Gear Ratio Lesson, WCCUSD STEM Aug. 2, 2015). (Year: 2015).*

(Continued)

*Primary Examiner* — Brian S Cook
(74) *Attorney, Agent, or Firm* — JCIPRNET (57) ABSTRACT

An information processing device includes an actuator emulator simulating a behavior of a first drive apparatus that is for driving a first control target, an actuator emulator simulating a behavior of a second drive apparatus that is for driving a second control target, a storage device for storing a PLC program including an instruction group with respect to the actuator emulator and a robot program including an instruction group with respect to the actuator emulator, a timer generating a virtual time, and a PLC emulator for repeatedly executing the instruction group included in the PLC program in each predetermined first control period in accordance with measurement using the virtual time, and a robot controller emulator for sequentially executing the instruction group included in the robot program in a predetermined execution order in accordance with the virtual time.

9 Claims, 9 Drawing Sheets

(52) U.S. Cl.
CPC ... *G05B 2219/34402* (2013.01); *Y10S 901/02* (2013.01); *Y10S 901/17* (2013.01); *Y10S 901/30* (2013.01)

(56) References Cited

OTHER PUBLICATIONS

Tsai_2014 (Synchronous Control of Linear Servo Systems for CNC Machine Tools, ResearchGate Jan. 2003 uploaded 2014) (Year: 2014).*
Debra_2015 (Geek Mom Projects EtchABot: a CNC Etch A Sketch, Nov. 21, 2015). (Year: 2015).*
Canned Cycle Defined (Archived Wikipedia dated Dec. 3, 2016 downloaded from https://en.wikipedia.org/w/index.php?title=Canned_cycle&oldid=752806612 ) (Year: 2016).*
"Search Report of Europe Counterpart Application", dated Sep. 3, 2018, p. 1-p. 9.

* cited by examiner

INFORMATION PROCESSING DEVICE, INFORMATION PROCESSING METHOD, AND NON-TRANSITORY COMPUTER-READABLE RECORDING MEDIUM

CROSS-REFERENCE TO RELATED APPLICATION

This application claims the priority benefit of Japan application serial no. 2017-154935, filed on Aug. 10, 2017. The entirety of the above-mentioned patent application is hereby incorporated by reference herein and made a part of this specification.

BACKGROUND

Technical Field

The disclosure relates to a technology for synchronously executing different types of control program.

Description of Related Art

Various factory automation (FA) systems have been developed to automate workpiece production procedures. Each of these FA systems includes, for example, a table for moving workpieces, a conveyor system for transporting workpieces, an arm robot for moving workpieces to a predetermined movement destination, and the like. Control targets such as tables, conveyor systems, arm robots, and the like will also be referred to as "transportation devices" below. These transportation devices are controlled by controllers such as programmable logic controllers (PLC) or robot controllers.

Normally, an architect checks whether a designed control program operates in a simulation as intended and then writes the control program into a controller. With regard to a technology for supporting such a simulation, Patent Document 1 (Japanese Laid-open No. 2016-42378) discloses a simulation device that includes visual sensors to realize an integrated simulation.

In recent years, controllers for synchronously driving various transportation devices have been developed. Accordingly, for example, an arm robot can pick up a workpiece placed on a table or the like while the table is moving.

Such control programs of various transportation devices may be written using different types of programming language in accordance with types of the transportation devices. In this case, different types of control program are synchronously executed to realize a synchronous simulation. Since the simulation device disclosed in Patent Document 1 does not synchronously execute different types of control program, it is not possible to simulate a synchronous operation of various transportation devices. Thus, a technology for synchronously executing different types of control program is proposed.

SUMMARY

According to an embodiment of the invention, an information processing device includes a first actuator emulator that simulates a behavior of a first drive apparatus that is for driving a first control target, a second actuator emulator that simulates a behavior of a second drive apparatus that is for driving a second control target, a storage device for storing a first control program that includes an instruction group with respect to the first actuator emulator and a second control program that includes an instruction group with respect to the second actuator emulator, a timer for generating a virtual time, a first controller emulator for repeatedly executing the instruction group included in the first control program in each predetermined first control period in accordance with measurement using the virtual time, and a second controller emulator for sequentially executing the instruction group included in the second control program in a predetermined execution order in accordance with the virtual time.

According to an embodiment of the invention, an information processing method includes a step of preparing a first control program that includes an instruction group with respect to a first actuator emulator that simulates a behavior of a first drive apparatus that is for driving a first control target and a second control program that includes an instruction group with respect to a second actuator emulator that simulates a behavior of a second drive apparatus that is for driving a second control target, a step of generating a virtual time, a step of repeatedly executing the instruction group included in the first control program in each predetermined first control period in accordance with measurement using the virtual time, and a step of sequentially executing the instruction group included in the second control program in a predetermined execution order in accordance with the virtual time.

According to an embodiment of the invention, an information processing program causes a computer to execute a step of preparing a first control program that includes an instruction group with respect to a first actuator emulator that simulates a behavior of a first drive apparatus that is for driving a first control target and a second control program that includes an instruction group with respect to a second actuator emulator that simulates a behavior of a second drive apparatus that is for driving a second control target, a step of generating a virtual time, a step of repeatedly executing the instruction group included in the first control program in each predetermined first control period in accordance with measurement using the virtual time, and a step of sequentially executing the instruction group included in the second control program in a predetermined execution order in accordance with the virtual time.

DESCRIPTION OF THE EMBODIMENTS

According to one or some exemplary embodiments of the invention, the second controller emulator calculates an execution time necessary for executing each of instructions included in the second control program in accordance with measurement using the virtual time, and while the second controller emulator is executing one instruction included in the second control program, the first controller emulator repeatedly executes the instruction group included in the first control program for the execution time necessary for executing the instruction.

According to one or some exemplary embodiments of the invention, after the first controller emulator repeats the instruction group included in the first control program for the execution time necessary for executing the one instruction, the second controller emulator starts execution of the next instruction after the one instruction.

According to one or some exemplary embodiments of the invention, the first controller emulator outputs a position command value of the first drive apparatus to the first actuator emulator in each of the first control periods.

According to one or some exemplary embodiments of the invention, the second controller emulator outputs a position command value of the second drive apparatus to the first actuator emulator in each of second control periods synchronized with the first control periods.

According to one or some exemplary embodiments of the invention, one control period between the first control period and the second control period is an integral multiple of the other control period.

According to the embodiments of the invention, different types of control program can be synchronously executed.

Each embodiment of the invention will be described below with reference to the drawings. The same reference numerals will be given to the same components and constituent elements in the following description. The same applies to names and functions thereof. Therefore, detailed description thereof will not be repeated.

[A. Configuration of FA System]

Figure 1:
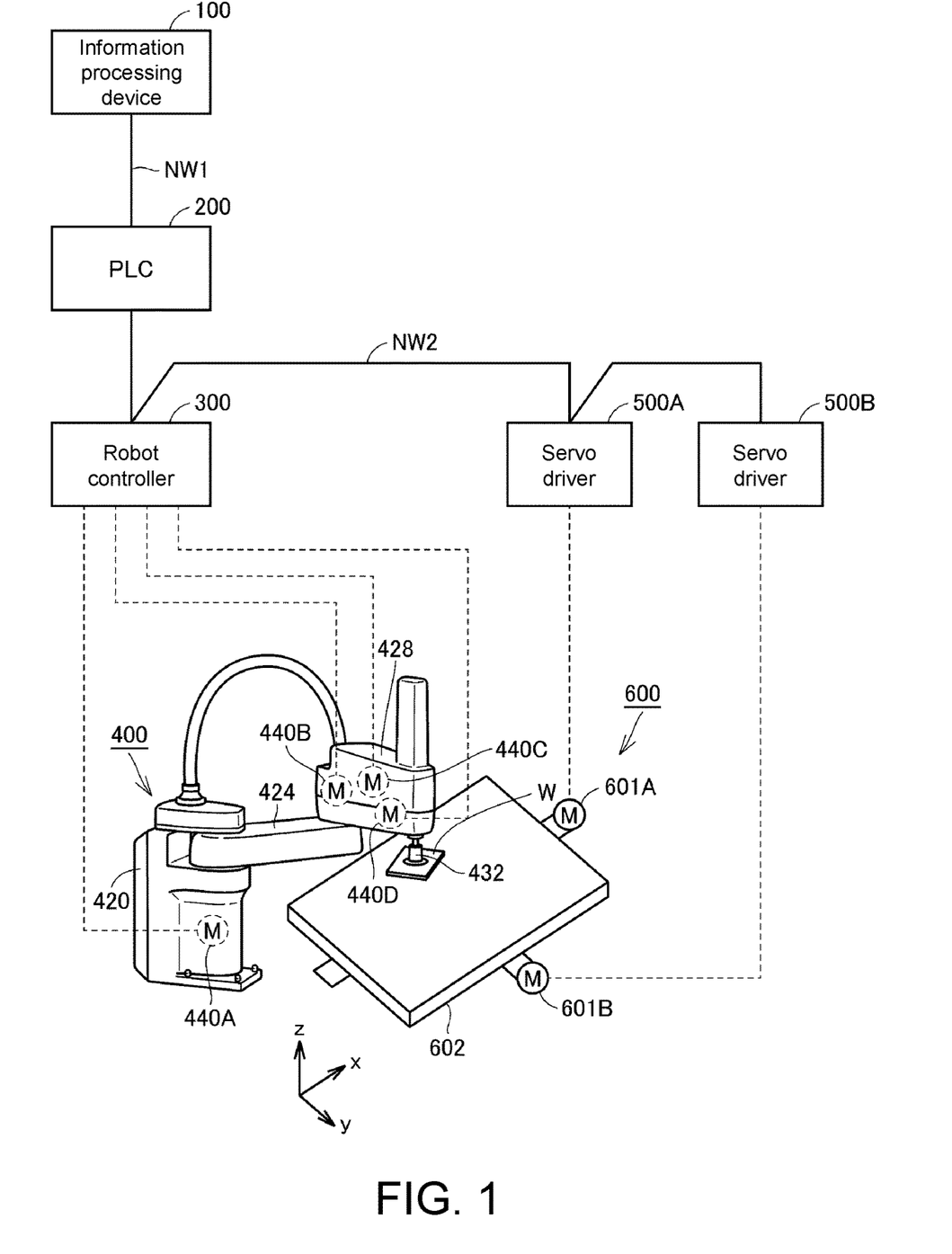
FIG. 1 is a diagram showing an example of a system configuration of an FA system according to an embodiment.

The disclosure relates to a technology for synchronously simulating transportation devices of different types constituting an FA system. To facilitate understanding, an example of an FA system that is a simulation target will be described with reference to FIG. 1 before a synchronous simulation is described. FIG. 1 is a diagram showing an example of a system configuration of an FA system 1.

The FA system 1 includes an information processing device 100, a programmable logic controller (PLC) 200, a robot controller 300, an arm robot 400, servo drivers 500A and 500B, and a moving table 600.

For convenience of description, a predetermined direction on a horizontal plane will also be referred to as an x direction below. In addition, a direction orthogonal to the x direction on the horizontal plane will also be referred to as a y direction. A direction orthogonal to the x and y directions will also be referred to as a z direction. That is, the z direction corresponds to the vertical direction.

The information processing device 100 provides an architect a development environment for designing control programs for the PLC 200 and the robot controller 300. The information processing device 100 is a support device, for example, a personal computer (PC), a tablet terminal, a smartphone, or the like. The information processing device 100 and the PLC 200 are connected to each other by a field network NW1. Ethernet (registered trademark), for example, can be employed for the field network NW1. However, the field network NW1 is not limited to Ethernet, and an arbitrary communication scheme can be employed. For example, the information processing device 100 and the PLC 200 may be directly connected to each other by a signal line.

The PLC 200, the robot controller 300, and the servo drivers 500A and 500B are connected to each other by a field network NW2 through a daisy chain. EtherCAT (registered trademark), for example, can be employed for the field network NW2. However, the field network NW2 is not limited to EtherCAT, and an arbitrary communication scheme can be employed.

The arm robot 400 is, for example, a SCARA robot. The arm robot 400 is constituted by a base 420, a first arm 424, a second arm 428, and an end-effector 432. The first arm 424 is connected to the base 420, and is rotatably driven by a servo motor 440A on an x-y plane having their connection point as a rotation axis. The second arm 428 is connected to the first arm 424 and is rotatably driven by a servo motor 440B on the x-y plane having their connection point as a rotation axis. The end-effector 432 is connected to the second arm 428, can be driven by a servo motor 440C in the z direction, and is rotatable by a servo motor 440D.

The servo motors 440A to 440D will also be referred to as servo motors 440 below. The robot controller 300 has a plurality of servo drivers (not illustrated) built thereinto, and each of the servo drivers controls its corresponding servo motor 440. An encoder (not illustrated) is provided on the rotation axis of each of the servo motors 440. The encoders provide feedback on positions (rotation angles) of the servo motors 440, rotational speeds of the servo motors 440, cumulative rotational speeds of the servo motors 440, and the like to the corresponding servo drivers. Note that the servo drivers need not necessarily be built into the robot controller 300, and may be provided separately from the robot controller 300.

The end-effector 432 is, for example, a pick-up tool for a workpiece W. The workpiece W is a product or a half-finished product. The end-effector 432 picks up the workpiece W by attracting the workpiece using suction power as an example. Note that, the arm robot 400 may pick up the workpiece W by gripping the workpiece W.

The moving table 600 includes servo motors 601A and 601B, and an installation stand 602 for the workpiece W. The servo motor 601A is controlled by the servo driver 500A and thereby drives the installation stand 602 in the x axis direction. The servo motor 601B is controlled by the servo driver 500B and thereby drives the installation stand 602 in the y axis direction. The installation stand 602 is driven to an arbitrary position on the x-y plane due to cooperative driving of the servo motors 601A and 601B.

The servo drivers 500A and 500B will also be referred to collectively as servo drivers 500, and the servo motors 601A and 601B will also be referred to collectively as servo motors 601 below. The servo drivers 500 control corresponding servo motors 601 thereof. An encoder (not illustrated) is provided on a rotation axis of each of the servo motors 601. The encoders give feedback on positions (rotational angles), rotational speeds, cumulative rotational speeds, and the like of the servo motors to the servo drivers 500.

The arm robot 400 and the moving table 600 are synchronously driven due to a cooperative operation of the PLC 200 and the robot controller 300. As a result, for example, the arm robot 400 can pick up the workpiece W placed on the installation stand 602 or the like while the moving table 600 is moving.

[B. Virtual FA System]

The information processing device 100 according to the present embodiment uses an emulator group for simulating the behavior of apparatuses included in the real FA system 1 in order to simulate operations of the FA system 1 shown in FIG. 1. The emulators mentioned here refer to programs that can reproduce the behavior of the apparatuses included in the FA system 1. By precisely simulating the behavior of the apparatuses included in the FA system 1 by each of the emulators, the information processing device 100 can precisely simulate operations of the real FA system 1.

Figure 2:
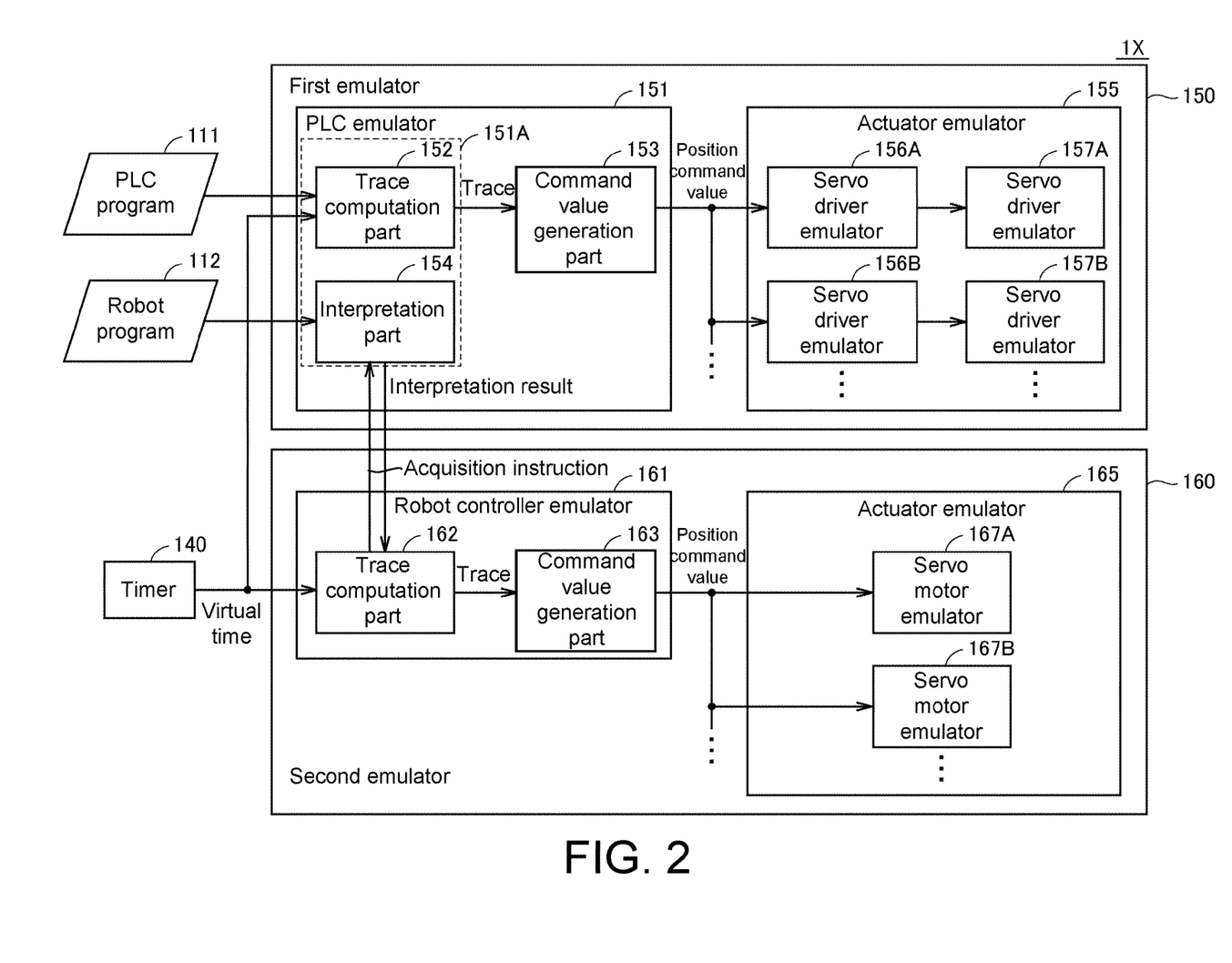
FIG. 2 is a diagram showing an example of a configuration of a virtual FA system according to an embodiment.
Figure 3:
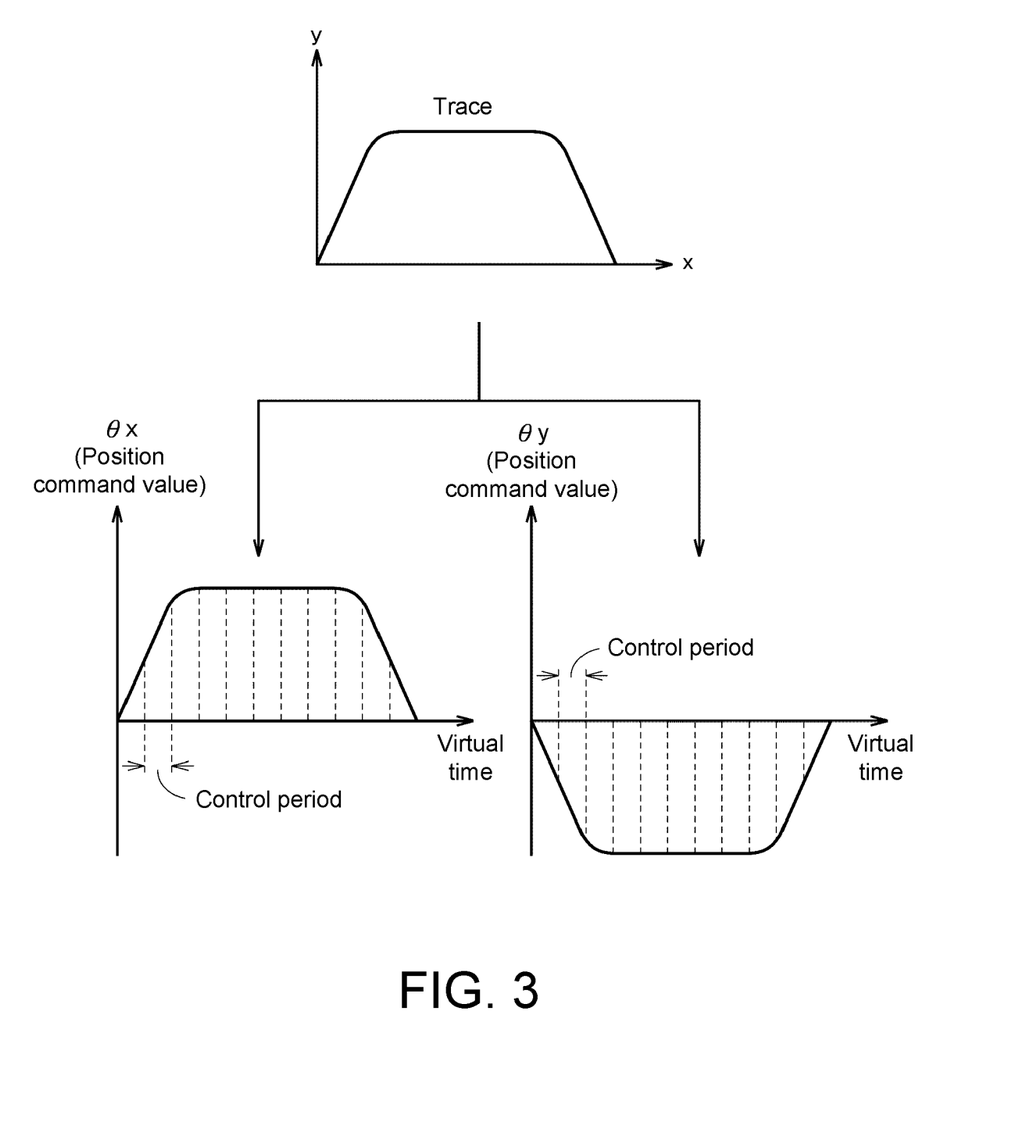
FIG. 3 shows exemplary graphs of generated traces.

A virtual FA system 1X constituted by emulators will be described below with reference to FIG. 2 and FIG. 3. FIG. 2 is a diagram showing an example of a configuration of the virtual FA system 1X.

As shown in FIG. 2, the virtual FA system 1X includes a timer 140 for generating virtual times, a first emulator 150, and a second emulator 160.

The first emulator 150 is constituted by a PLC emulator 151 (a first controller emulator) that simulates the behavior of the PLC 200 and an actuator emulator 155 that simulates the behavior of the drive apparatuses of the moving table 600. The PLC emulator 151 is constituted by a command value generation part 153. The actuator emulator 155 is constituted by servo driver emulators 156A and 156B for simulating the behavior of the servo drivers 500A and 500B (refer to FIG. 1) and servo motor emulators 157A and 157B for simulating the behavior of the servo motors 601A and 601B (refer to FIG. 1).

An execution part 151A executes a PLC program 111 (a first control program) for controlling the actuator emulator 155 (a first actuator emulator) and a robot program 112 (a second control program) for controlling the actuator emulator 165 (a second actuator emulator). Execution Modes for the control programs used by the execution part 151A include a "synchronous execution mode" in which the PLC program 111 and the robot program 112 are synchronously executed in accordance with a virtual time generated by the timer 140 and an "asynchronous execution mode" in which the PLC program 111 and the robot program 112 are asynchronously executed. Details of the synchronous execution mode and the asynchronous execution mode will be described below.

The execution part 151A is constituted by a trace computation part 152 and an interpretation part 154. The trace computation part 152 reads the PLC program 111 for driving the actuator emulator 155 in a simulation and then generates a trace for driving the actuator emulator 155. The PLC program 111 is written in a cyclic execution type programming language, for example, a ladder language or a structured text language. Cyclic execution type is an execution form in which an instruction group included in a program is repeatedly executed in each of predetermined control periods. That is, the trace computation part 152 repeatedly executes an instruction group included in the PLC program 111 in each predetermined control period (a first control period). A virtual time generated by the timer 140 is a measure of a control period.

The PLC program 111 includes a movement instruction for moving the moving table 600 to a target position. When the movement instruction included in the PLC program 111 is executed, the trace computation part 152 generates a trace for the actuator emulator 155 moving a control target in a simulation. The trace is generated on the basis of, for example, a current position of an object to be driven and a target position included in the movement instruction. FIG. 3 shows graphs showing an example of generated traces. Although traces on the x-y plane are shown in the example of FIG. 3, a generated trace may be one-dimensional or three-dimensional. The generated trace is output to the command value generation part 153. The trace computation part 152 transmits an interpretation instruction of the next instruction to the interpretation part 154 on the basis of the fact that a position of the arm robot driven by the actuator emulator 165 has reached the target position.

The command value generation part 153 generates position command values to be output to the actuator emulator 155 in accordance with the generated trace. The position command value is a control value for driving the servo motor emulators 157A and 157B in a simulation, and denotes, for example, a rotational angle, a rotational speed, a position, or the like. In the example of FIG. 3, the command value generation part 153 generates a rotational angle θx for the servo motor emulator 157A and a rotational angle θy for the servo motor emulator 157B as position command values in each control period. The corresponding rotational angles θx and θy are sequentially output to the servo motor emulators 157A and 157B in accordance with a current virtual time.

The servo driver emulators 156A and 156B drive the servo motor emulators 157A and 157B in a simulation in accordance with the position command values output from the command value generation part 153.

The second emulator 160 is constituted by a robot controller emulator 161 (a second controller emulator) that simulates the behavior of the robot controller 300 and an actuator emulator 165 that simulates the behavior of the drive apparatuses of the arm robot 400. The robot controller emulator 161 is constituted by a trace computation part 162 and a command value generation part 163. The actuator emulator 165 is constituted by servo motor emulators 167A and 167B that simulate the behavior of the servo motors 440A and 440B shown in FIG. 1.

The interpretation part 154 executes the robot program 112. The robot program 112 includes an instruction group for driving the actuator emulator 165 (the second actuator emulator) in a simulation. The robot program 112 is written in a sequential execution type robot programming language. Sequential execution type refers to an execution form in which an instruction group included in a program is sequentially executed in accordance with a predetermined execution order. That is, the interpretation part 154 sequentially executes the instruction group included in the robot program 112 (the second control program) in a predetermined execution order. The execution of the instruction group is performed in accordance with virtual times generated by the timer 140. In the example of FIG. 2, the interpretation part 154 interprets the instruction group included in the robot program 112 in a predetermined execution order, and sequentially outputs the interpretation results to the robot controller emulator 161.

When an interpretation result output from the interpretation part 154 indicates a movement instruction, the trace computation part 162 generates a trace for the actuator emulator 165 moving the control target in a simulation. The trace is generated on the basis of a current position of the object to be driven and a target position included in the movement instruction. The generated trace is output to the command value generation part 163.

The command value generation part 163 generates position command values to be output to the actuator emulator 165 in accordance with the trace output from the trace computation part 162. The position command value is a control value for driving the servo motor emulators 167A and 167B in a simulation, and denotes, for example, a virtual rotational angle, rotational speed, position, or the like of the servo motor emulators 167A and 167B. Since the method for generating position command values for the actuator emulator 165 is the same as the method for generating position command values for the actuator emulator 155, description thereof will not be repeated.

The servo motor emulators 167A and 167B are driven in a simulation in accordance with the position command values output from the command value generation part 163. Note that the actuator emulator 165 may include a servo driver emulator like the actuator emulator 155.

Note that, although the PLC program 111 and the robot program 112 are exemplified above, control programs to be executed by the information processing device 100 are not limited to the PLC program 111 and the robot program 112. Arbitrary control programs are employed as the control programs as long as the control programs may be written in different types of programming language.

As described above, the PLC emulator 151 and the robot controller emulator 161 can perform synchronously simulation of different types of control targets (e.g., the arm robot, the moving table, and the like) by executing the programs (i.e., the PLC program 111 and the robot program 112) having different execution forms in accordance with the common timer 140. In addition, operations of the FA system 1 can be precisely simulated by using the emulator group that can precisely simulate operations of devices built in the FA system 1.

[C. Synchronous Execution Process of Control Programs]

Figure 4:
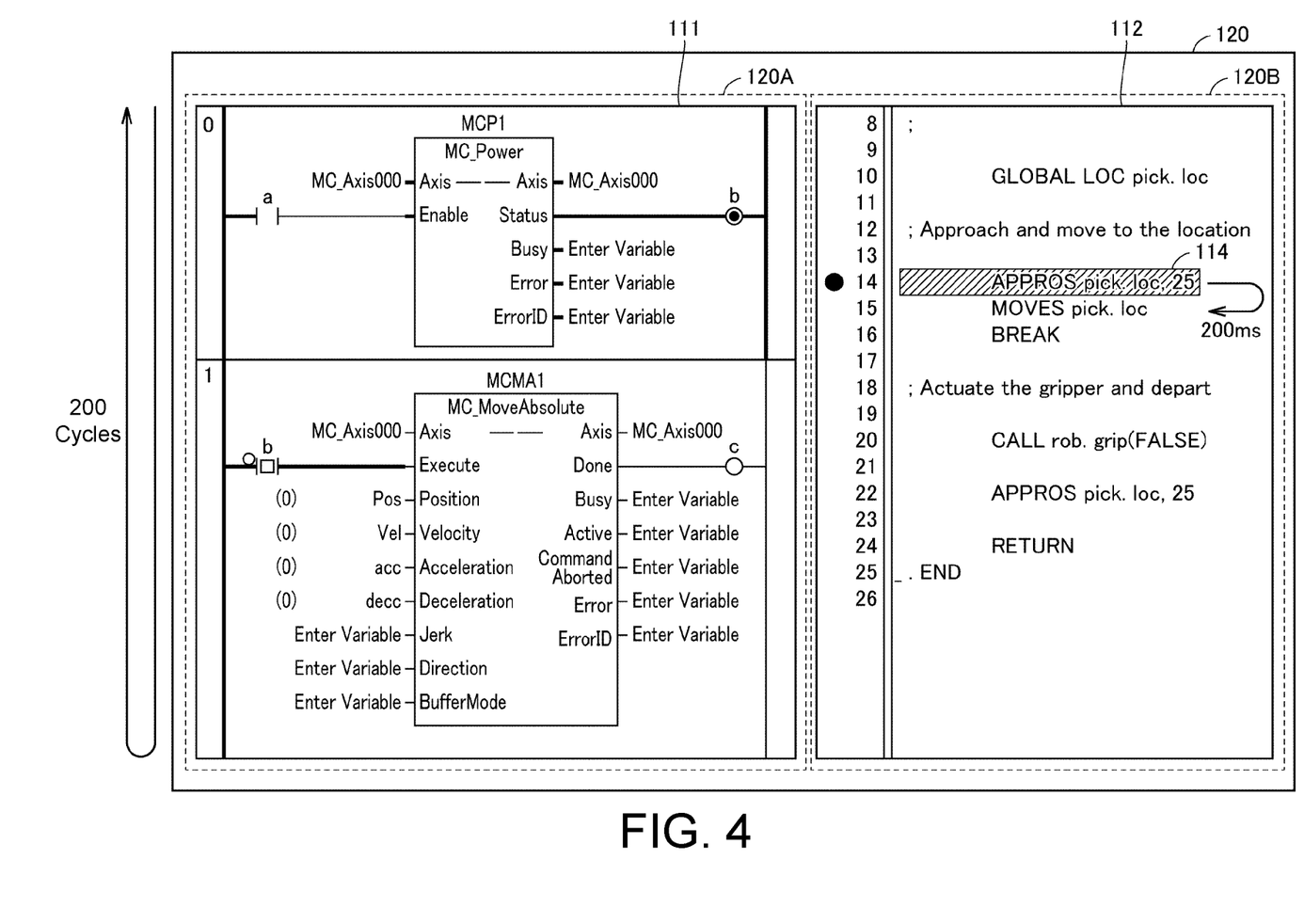
FIG. 4 is a diagram showing an example of a design screen of a PLC program and a robot program.
Figure 5:
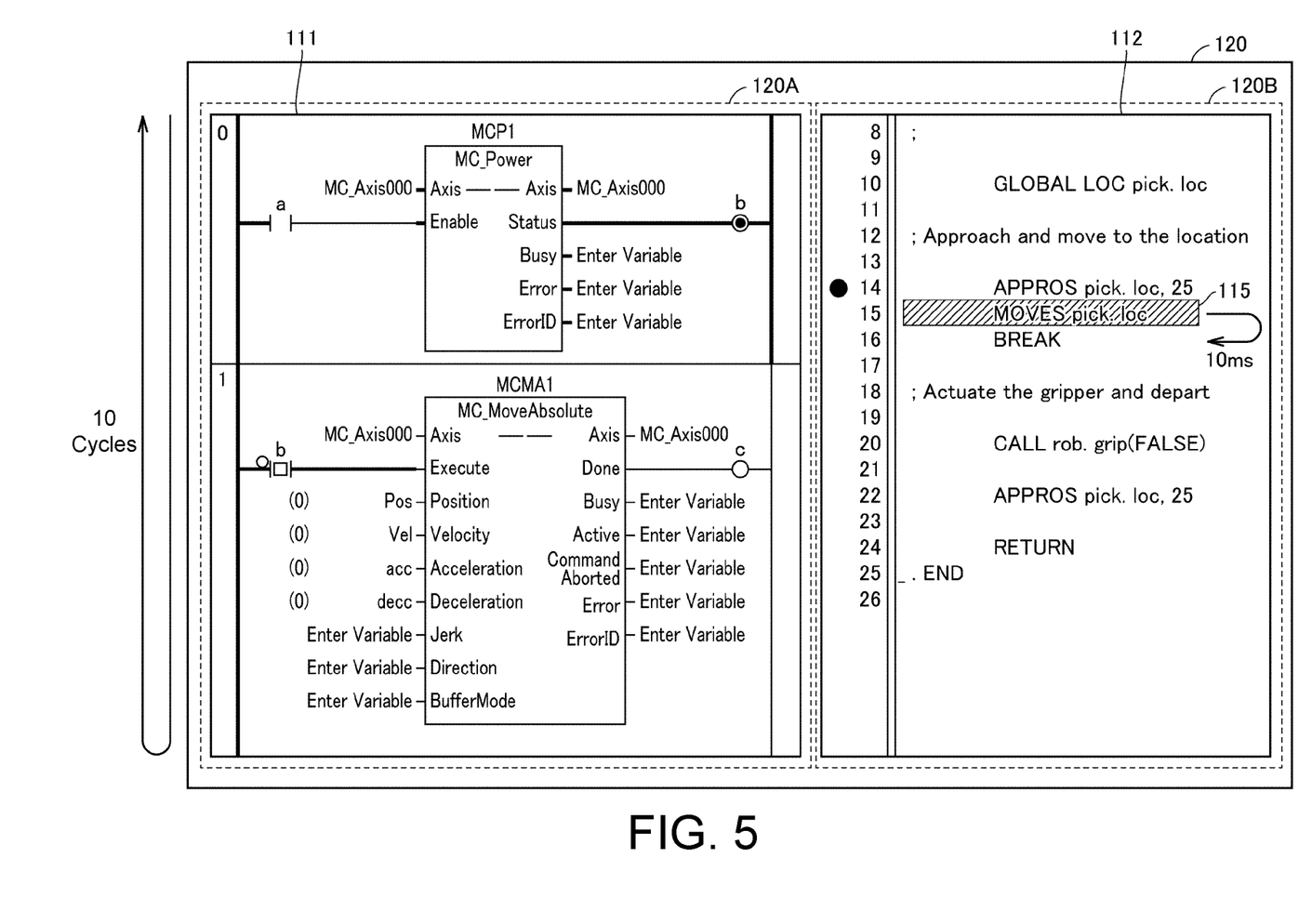
FIG. 5 is a diagram showing an example of the design screen of the PLC program and the robot program.

A synchronous execution process performed by the virtual FA system 1X described with reference to FIG. 3 will be described with reference to FIG. 4 and FIG. 5. FIG. 4 and FIG. 5 are diagrams showing examples of a design screen for the PLC program 111 and the robot program 112.

FIG. 4 and FIG. 5 show a display part 120 of the information processing device 100. The display part 120 includes an editing area 120A for the PLC program 111, an editing area 120B for the robot program 112. The editing areas 120A and 120B are displayed on one screen side by side. Accordingly, an architect can design the PLC program 111 and the robot program 112 in parallel.

As described above, the PLC program 111 is a cyclic execution type program. Thus, the PLC emulator 151 (refer to FIG. 2) repeatedly executes an instruction group included in the PLC program 111 in a predetermined control period. More specifically, the PLC emulator 151 executes the PLC program 111 from the top line to the bottom line in one control period. In the next control period, the PLC emulator 151 executes the PLC program 111 from the top line to the bottom line again.

Meanwhile, the robot program 112 is a sequential execution type program. Thus, the interpretation part 154 (refer to FIG. 2) sequentially interprets an instruction group included in the robot program 112 in a predetermined execution order. As a result, the robot controller emulator 161 executes the robot program 112 line by line from the top in order. At this time, the interpretation part 154 does not interpret the instruction of the next line before the execution of the instruction of each of lines is completed. More specifically, robot controller emulator 161 gives feedback on completion of execution of a current instruction to the interpretation part 154 based on the fact of the completion. The interpretation part 154 receives the feedback and then interprets the instruction of the next line.

Based on the difference of the execution forms described above, the instruction group of the PLC program 111 and the instruction group of the robot program 112 are executed in synchronized control periods to make the PLC program 111 and the robot program 112 to be synchronously executed.

To realize synchronous execution, the interpretation part 154 calculates an execution time necessary for execution of each of instructions included in the robot program 112 (the second control program). The execution time mentioned here may be represented by an index correlating to a correlation measure to a time required for executing instructions included in the robot program 112, and may be represented by, for example, the number of cycles of a control period required for executing each of the instructions included in the robot program 112. A virtual time generated by the timer 140 is used as a measure of the number of cycles. The unit of virtual time is indicated by, for example, "ms." In the example of FIG. 4, the number of cycles lasting "200 ms" is specified as a robot instruction 114 indicated on the 14th line of the robot program 112. "APPROS pick loc, 25" indicated as the robot instruction 114 is a movement command for moving the arm robot 400 to a target position "25." By interpreting the movement instruction by the interpretation part 154, "200 ms" is specified as the number of cycles in the control period required for moving the arm robot 400 to the target position.

The PLC emulator 151 repeatedly executes the instruction group included in the PLC program 111 for the time "200 ms" that is necessary for execution of the robot instruction 114 while the robot controller emulator 161 is executing the robot instruction 114. As an example, in a case in which the control period of the PLC program 111 is "1 ms," the PLC emulator 151 repeatedly executes the PLC program 111 for 200 cycles (=200 ms/1 ms) while the robot instruction 114 is being executed.

After the PLC emulator 151 repeats the instruction group included in the PLC program 111 for an execution time required for the execution of the robot instruction 114, the robot controller emulator 161 starts executing the next instruction after the robot instruction 114. An example thereof is shown in FIG. 5. In the example of FIG. 5, the interpretation part 154 switches control from the robot instruction 114 to a robot instruction 115. "MOVES pick.loc" indicated by the robot instruction 115 is a movement instruction for moving the arm robot to a target position "pick.loc." By interpreting the robot instruction 115 by the interpretation part 154, an execution time "10 ms" necessary for moving the arm robot 400 to the target position is specified. The execution time is specified before or when execution of the robot instruction 115 is started.

Thereafter, the PLC emulator 151 repeatedly executes the instruction group included in the PLC program 111 for "10 ms" that is necessary for the execution of the robot instruction 115 while the interpretation part 154 is executing the robot instruction 115. As an example, in a case in which the control period of the PLC program 111 is "1 ms," the PLC emulator 151 repeatedly executes the PLC program 111 for 10 cycles (=10 ms/1 ms) while the robot instruction 115 is being executed.

(D. Synchronous Output Process of Position Command Value)

To simulate a communication mode in EtherCAT, the first emulator 150 (refer to FIG. 2) outputs a position command value to the actuator emulator 155 in each control period predetermined in accordance with a communication period of EtherCAT. Likewise, the second emulator 160 (refer to FIG. 2) outputs a position command value to the actuator emulator 165 in each control period predetermined in accordance with the communication period of EtherCAT. Accordingly, an operation of the FA system 1 can be simulated in the same communication mode as in an actual system.

Figure 6:
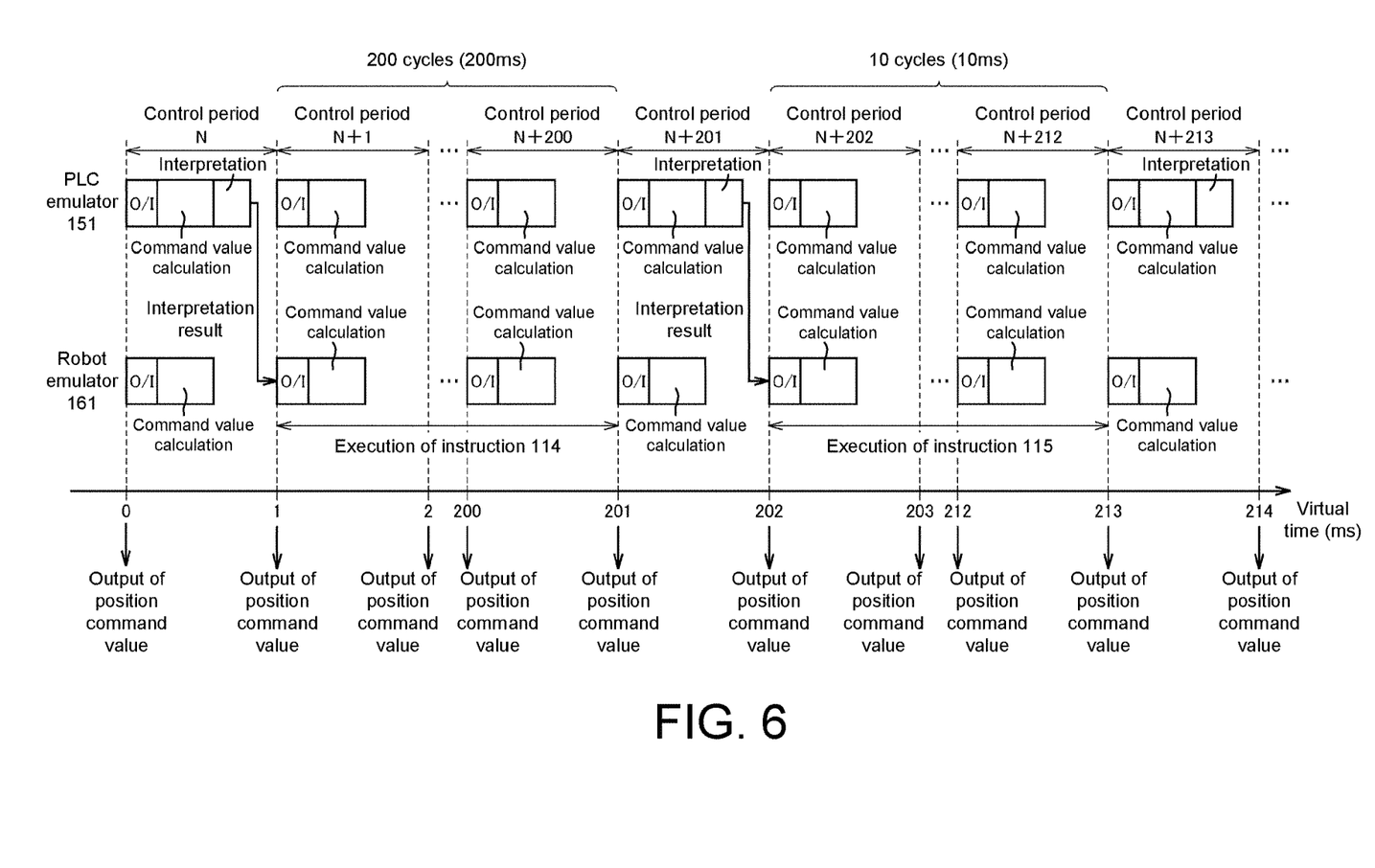
FIG. 6 is a diagram for describing a synchronization process of output timings of position command values for actuator emulators.

FIG. 6 is a diagram for describing a synchronization process of output timings of position command values with respect to the actuator emulators 155 and 165 (refer to FIG. 2). The synchronization process of the output timings of position command values will be described by exemplifying an execution procedure of the robot instructions 114 and 115 (refer to FIG. 4 and FIG. 5) included in the robot program 112 below.

In a control period "N," the first emulator 150 executes an output/input (O/I) process, a command value calculation process, and an interpretation process in that order. The second emulator 160 executes the O/I process and the command value calculation process in that order. The O/I process is a process of outputting the result of the previous command value calculation process, and then acquiring information necessary for the current command value calculation process as an input. The command value calculation process is a process of calculating position command values for the actuator emulators 155 and 165. The interpretation process is a process of interpreting the robot program 112. In the example of FIG. 6, "200 ms" is specified for the execution time of a control period necessary for execution of the robot instruction 114 included in the robot program 112 through the interpretation process.

The first emulator 150 repeatedly executes the PLC program for the execution time "200 ms" of the robot instruction 114 while the second emulator 160 is executing the robot instruction 114. In a case in which the control period is "1 ms," the first emulator 150 executes the PLC program 111 for 200 cycles (=200 ms/1 ms). During that time, the first emulator 150 executes the O/I process and the command value calculation process in each control period of "1 ms," and outputs a position command value to the actuator emulator 155 in each control period of "1 ms."

Meanwhile, the second emulator 160 executes the O/I process and the command value calculation process in each predetermined control period while the robot instruction 114 is being executed. In a case in which the control period is "1 ms," the second emulator 160 executes the O/I process and the command value calculation process in each control period of "1 ms," and outputs a position command value to the actuator emulator 165 in each control period of "1 ms."

In a control period "N+200" that is "200 ms" after the execution of the robot instruction 114, the execution of the robot instruction 114 is completed. In the next control period "N+201", the first emulator 150 executes the interpretation process of the next robot instruction 115. In the example of FIG. 6, "10 ms" is specified as the execution time of the control period necessary for execution of the robot instruction 115 through the interpretation process.

The first emulator 150 repeatedly executes the PLC program 111 for the execution time "10 ms" of the robot instruction 115 while the second emulator 160 is executing the robot instruction 115. In a case in which the control period is "1 ms," the first emulator 150 executes the PLC program 111 for 10 cycles (=10 ms/1 ms). During that time, the first emulator 150 executes the O/I process and the command value calculation process and outputs a position command value to the actuator emulator 155 in each control period of "1 ms."

Meanwhile, the second emulator 160 executes the O/I process and the command value calculation process in each predetermined control period while executing the robot instruction 115. In a case in which the control period is "1 ms," the second emulator 160 executes the O/I process and the command value calculation process in each control period of "1 ms" and outputs a position command value to the actuator emulator 165 in each control period of "1 ms."

As described above, since the position command values are output to each of the actuator emulators 155 and 165 with the first emulator 150 and the second emulator 160 synchronized with each other, control targets of different types (e.g., the arm robot, the moving table, and the like) can be synchronized.

Note that, although the example in which the control period of the first emulator 150 and the control period of the second emulator 160 are the same has been described above, these control periods may differ from each other as long as the control periods are synchronized. As an example, one of the control periods may be an integral multiple of the other control period. For example, the control period of the first emulator 150 may be "1 ms," and the control period of the second emulator 160 may be "2 ms."

[E. Simulation Screen]

Figure 7:
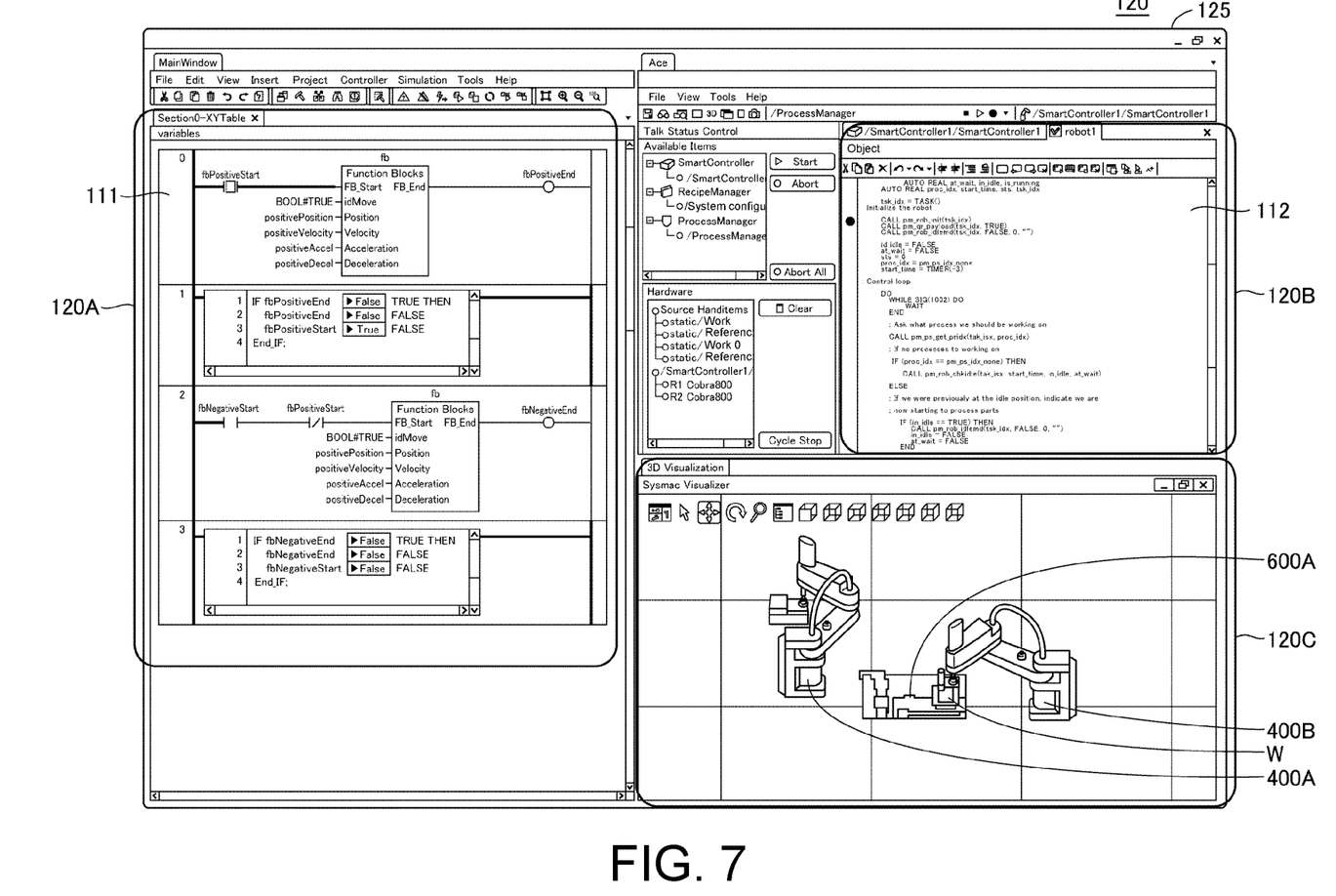
FIG. 7 is a diagram showing an example of a simulation screen of an information processing device according to an embodiment.

FIG. 7 shows an example of a simulation screen of the information processing device 100. The example of the simulation screen for realizing a synchronous simulation will be described with reference to FIG. 7.

A user interface 125 for editing the PLC program 111 and the robot program 112 is shown on the display part 120 of the information processing device 100. The user interface 125 includes the editing area 120A of the PLC program 111, the editing area 120B of the robot program 112, and a display area 120C in which an operation of a control target such as the arm robot or the moving table is displayed in real time.

The display area 120C shows robot images 400A and 400B indicating the actual arm robot 400 and a moving table image 600A indicating the actual moving table 600. The robot images 400A and 400B and the moving table images 600A are generated from, for example, a computer aided design (CAD) data, or the like. As an example, the information processing device 100 has a function of importing CAD data in a three-dimensional shape, and thus reads CAD data of the arm robot 400 and CAD data of the moving table 600 using the importing function. In a case in which the synchronous simulation is performed with respect to two arm robots 400 and the one moving table 600, the information processing device 100 generates three-dimensional data of the two arm robots from the CAD data of the arm robots 400 and three-dimensional data of the one moving table from the CAD data of the moving table 600.

As in the example of FIG. 7, in the case in which a simulation is performed with respect to the one moving table 600 and the two arm robots 400, one first emulator 150 and two second emulators 160 are used. As described above, the first emulator 150 and the second emulators 160 output position command values to corresponding actuator emulators in accordance with synchronized control periods. The information processing device 100 sequentially updates each piece of three-dimensional data of the arm robots and the three-dimensional data of the moving table based on the sequentially output position command values. The information processing device 100 sequentially updates display of the robot images 400A and 400B from each of the sequentially updated three-dimensional data of the arm robots. In synchronization with the updating, the information processing device 100 sequentially updates display of the moving table image 600A from the sequentially updated three-dimensional data of the moving table.

Accordingly, the display of the robot images 400A and 400B and the display of the moving table image 600A are synchronously updated in accordance with the execution of the PLC program 111 and the robot program 112. Accordingly, the architect can easily ascertain whether the PLC program 111 and the robot program 112 are operating as intended, and thus can easily debug the PLC program 111 and the robot program 112.

[F. Hardware Configuration of Information Processing Device 100]

Figure 8:
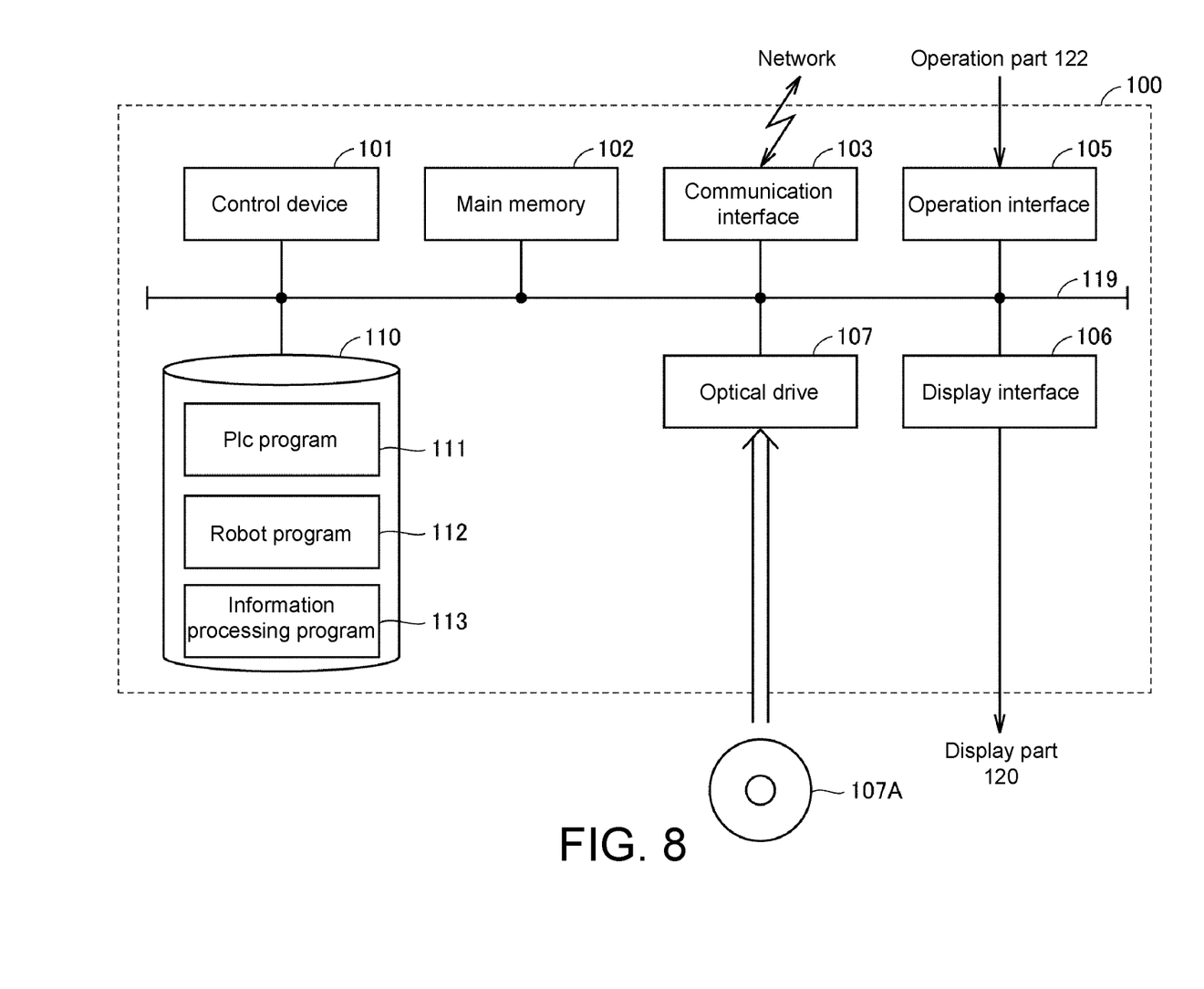
FIG. 8 is a schematic diagram showing a hardware configuration of the information processing device according to an embodiment.

A hardware configuration of the information processing device 100 will be described with reference to FIG. 8. FIG. 8 is a schematic diagram showing a hardware configuration of the information processing device 100.

The information processing device 100 is a computer configured according to general computer architecture as an example. The information processing device 100 includes a control device 101, a main memory 102, a communication interface 103, an operation interface 105, a display interface 106, an optical drive 107, and a storage device 110 (a storage part). These components are connected to one another via an internal bus 119 so as to communicate with each other.

The control device 101 is constituted by, for example, at least one integrated circuit. The integrated circuit is constituted by, for example, at least one central processing unit (CPU), at least one application specific integrated circuit (ASIC), at least one field programmable gate array (FPGA), a combination thereof, or the like. The control device 101 realizes various processes according to the present embodiment by developing and executing programs in the main memory 102. The main memory 102 is constituted by a volatile memory, and functions as a work memory that is necessary for the control device 101 to execute programs.

The communication interface 103 is for exchanging data with external apparatuses via a network. The external apparatuses include, for example, the above-described PLC 200 (refer to FIG. 1), a server, another communication apparatus, and the like. The information processing device 100 may be able to download an information processing program 113 via the communication interface 103. The information processing program 113 is a program for providing a comprehensive development environment for the PLC program 111 and the robot program 112, and provides a function of the above-described synchronous simulation process or the like.

The operation interface 105 is connected to an operation part 122 and takes in a signal indicating a user operation from the operation part 122. The operation part 122 typically includes a keyboard, a mouse, a touch panel, a touch pad, and the like, and receives operations from a user. The architect can edit the PLC program 111 and the information processing program 113 using the operation part 122.

The display interface 106 is connected to the display part 120, and transfers an image signal for displaying an image to the display part 120 in accordance with a command from the control device 101 or the like. The display part 120 is a display, an indicator, or the like, and presents various kinds of information to a user.

The optical drive 107 reads various programs stored in an optical disc 107A or the like therefrom and installs the programs in the storage device 110. The storage device 110 stores, for example, the information processing program 113 and the like.

Although FIG. 8 shows a configuration example in which the necessary programs are installed in the information processing device 100 via the optical drive 107, the embodiments of the invention are not limited thereto, and such programs may be downloaded from a server device on a network or the like. Alternatively, such programs to be executed on the information processing device 100 may be rewritten with a program written in a storage medium such as a universal serial bus (USB) memory, a secure digital (SD) card, CompactFlash (CF), or the like.

The storage device 110 is, for example, a hard disk or an external storage medium. As an example, the storage device 110 stores the PLC program 111 that is under development and the information processing program 113. The information processing program 113 may be provided to be incorporated into a part of an arbitrary program, rather than as a single program. In this case, the synchronization process according to the present embodiment is realized in cooperation with the arbitrary program. A program, despite the fact that it does not include such a partial module, does not impart from the gist of the information processing device 100 according to the present embodiment. Furthermore, some or all of functions provided by the information processing program 113 according to the present embodiment may be realized using dedicated hardware. Furthermore, the information processing device 100 may be in the form of a so-called cloud service in which at least one server realizes the synchronization process according to the present embodiment.

[G. Control Structure of Information Processing Device 100]

Figure 9:
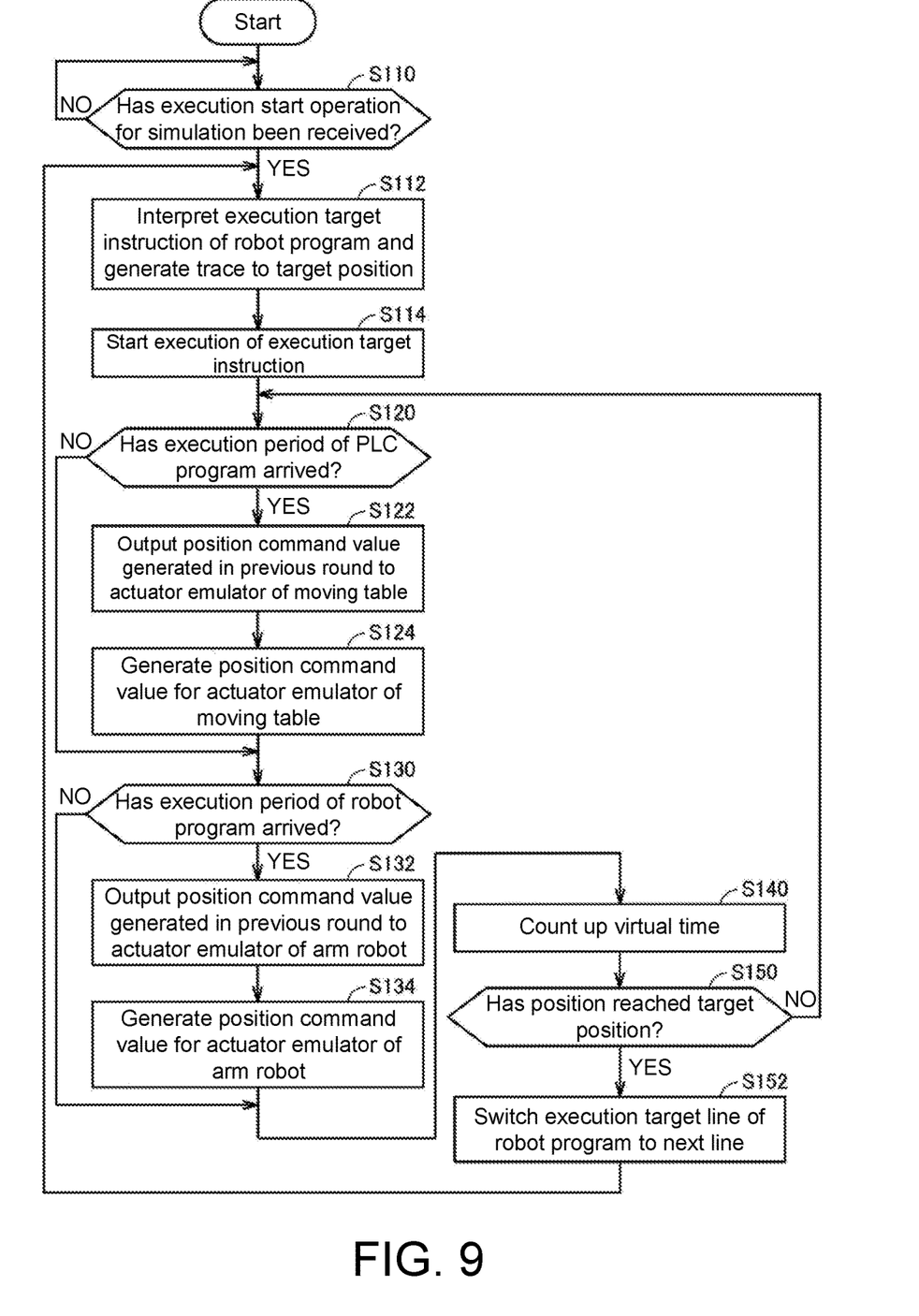
FIG. 9 is a flowchart showing a part of a process executed by a control device of the information processing device according to an embodiment.

A control structure of the information processing device 100 will be described with reference to FIG. 9. FIG. 9 is a flowchart showing a part of a process executed by the control device 101 of the information processing device 100. The process of FIG. 9 is realized by the control device 101 executing a program. In another aspect, some or the entire process may be executed by a circuit element of another piece of hardware.

In Step S110, the control device 101 determines whether an operation of starting execution of a synchronous simulation has been received. As an example, the control device 101 determines that an operation of starting execution of a synchronous simulation has been received on the basis of the fact that an execution button for a synchronous simulation on the user interface 125 (refer to FIG. 7) has been pressed. If it is determined that an operation of starting execution of a synchronous simulation has been received (YES in Step S110), the control device 101 switches control to Step S112. If it is not (NO in Step S110), the control device 101 executes the process of Step S110 again.

In Step S112, the control device 101 interprets a robot instruction indicated on an execution target line of the robot program 112, serving as the above-described interpretation part 154 (refer to FIG. 2), and executes a trace computation for driving the actuator emulator 155 in a simulation. The number of cycles necessary for executing the robot instruction indicated on the execution target line is specified from the computation result.

In Step S114, the control device 101 functions as the robot controller emulator 161 that simulates an operation of the robot controller 300, and starts executing the robot instruction that is the execution target.

In Step S120, the control device 101 determines whether an execution period of the PLC program 111 has arrived based on a virtual time indicated by the timer 140. If it is determined that an execution period of the PLC program 111 has arrived (YES in Step S120), the control device 101 switches control to Step S122. If it is not (NO in Step S120), the control device 101 switches control to Step S130.

In Step S122, the control device 101 outputs the position command value generated in Step S124 of the previous round to the actuator emulator 155 of the moving table 600. That is, the position command value generated in Step S124 of the succeeding round is output to the actuator emulator 155 when Step S122 is executed in the next round.

In Step S124, the control device 101 generates a position command value to be output to the actuator emulator 155 of the moving table 600, serving as the above-described command value generation part 153 (refer to FIG. 2). Since the method of generating the position command value is as described in FIG. 3, description thereof will not be repeated.

In Step S130, the control device 101 determines whether an execution period of the robot program 112 has arrived based on a virtual time indicated by the timer 140. Note that, in a case in which the execution period of the PLC program 111 is the same as the execution period of the robot program 112, the determination process of Step S130 may be omitted. If it is determined that an execution period of the robot program 112 has arrived (YES in Step S130), the control device 101 switches control to Step S132. If it is not (NO in Step S130), the control device 101 switches control to Step S140.

In Step S132, the control device 101 outputs the position command value generated in Step S134 of the previous round to the actuator emulator 165 of the arm robot 400. That is, the position command value generated in Step S134 of the succeeding round is output to the actuator emulator 165 when Step S132 is executed in the next round.

In Step S134, the control device 101 functions as the PLC emulator 151 that simulates an operation of the robot controller 300, and generates a position command value to be output to the actuator emulator 155 of the arm robot 400, serving as the above-described command value generation part 163 (refer to FIG. 2). Since the method for generating the position command value is as described in FIG. 3, description thereof will not be repeated.

In Step S140, the control device 101 counts up virtual times of the timer 140. Virtual times are counted up, for example, by 1 ms.

In Step S150, the control device 101 determines whether the position of the arm robot that is driven in the simulation by the actuator emulator 165 has reached a target position on the basis of the number of cycles specified in Step S112. If it is determined that the position of the arm robot driven in the simulation by the actuator emulator 165 has reached the target position (YES in Step S150), the control device 101 switches control to Step S152. If it is not (NO in Step S150), the control device 101 returns control to Step S120.

In Step S152, the control device 101 switches the execution target line of the robot program 112 to the next line, serving as the above-described interpretation part 154.

[K. Conclusion]

As described above, the information processing device 100 repeatedly executes an instruction group included in the cyclic execution type PLC program 111 in each predetermined control period in accordance with measurement using a virtual time generated by the timer 140. In addition, the information processing device 100 sequentially executes an instruction group included in the sequential execution type robot program 112 in an execution order in accordance with the virtual times generated by the timer 140. In this manner, programs having different execution forms are synchronously executed by executing the PLC program 111 and the robot program 112 based on the common virtual times. As a result, an operation of different types of control targets (e.g., the arm robot, the moving table, and the like) can be synchronously simulated.

It should be considered that the embodiments disclosed above are illustrative, and not limitative. The scope of the invention is defined based on the claims, not the above description, and meanings equivalent to the claims and all modifications made within the claims are intended to be included in the scope of the invention.

What is claimed is:

1. An information processing device comprising:
   a first actuator emulator that simulates a behavior of a first drive apparatus that drives a first control target;
   a second actuator emulator that simulates a behavior of a second drive apparatus that drives a second control target;
   a storage device that stores a first control program written in a cyclic execution type programming language that comprises a first instruction group having a plurality of instructions to be executed in a cyclical manner within a predetermined first control period with respect to the first actuator emulator and a second control program written in a sequential execution type programming language that comprises a second instruction group to be executed in a predetermined execution order and comprises a first instruction and a second instruction with respect to the second actuator emulator;
   a timer that generates a virtual time;
   a first controller emulator that repeatedly executes the first instruction group comprised in the first control program in each of the predetermined first control period in accordance with measurement using the virtual time; and
   a second controller emulator that sequentially executes the second instruction group comprised in the second control program in the predetermined execution order in accordance with the virtual time, wherein
   the second controller emulator calculates a first execution time necessary for executing the first instruction comprised in the second control program in accordance with measurement using the virtual time and executes the first instruction,
   the first controller emulator repeatedly executes the plurality of instructions during the first execution time, and the second controller emulator transmits a completion of the first instruction to the first control emulator in response to the first instruction having been completed,
   after the second controller emulator transmits the completion of the first instruction to the first controller emulator, the second controller emulator calculates a second execution time necessary which is different from the first execution time for executing the second instruction comprised in the second control program in accordance with measurement using the virtual time and executes the second instruction, and
   the first controller emulator repeatedly executes the plurality of instructions during the second execution time, and the second controller emulator transmits a completion of the second instruction to the first control emulator in response to the second instruction having been completed.

2. The information processing device according to claim 1, wherein the first controller emulator outputs a position command value of the first drive apparatus to the first actuator emulator in each of the first control periods.

3. The information processing device according to claim 1, wherein the second controller emulator outputs a position command value of the second drive apparatus to the first actuator emulator in each of second control periods synchronized with the first control periods.

4. The information processing device according to claim 2, wherein the second controller emulator outputs a position command value of the second drive apparatus to the first actuator emulator in each of second control periods synchronized with the first control periods.

5. The information processing device according to claim 2, wherein the first control period is an integral multiple of the second control period.

6. The information processing device according to claim 3, wherein the first control period is an integral multiple of the second control period.

7. An information processing method comprising:
   simulating, by a first actuator emulator, a behavior of a first drive apparatus that drives a first control target;
   simulating, by a second actuator emulator, a behavior of a second drive apparatus that drives a second control target;
   storing, by a storage device, a first control program written in a cyclic execution type programming language that comprises a first instruction group having a plurality of instructions to be executed in a cyclical manner within a predetermined first control period with respect to the first actuator emulator,
   storing, by the storage device, a second control program written in a sequential execution type programming language that comprises a second instruction group to be executed in a predetermined execution order and comprises a first instruction and a second instruction with respect to the second actuator emulator;
   generating, by a timer, a virtual time to be used by a first control emulator for executing repeatedly the first instruction group comprised in the first control program in each of the predetermined first control period in accordance with measurement using the virtual time and to be used by a second control emulator for executing sequentially the second instruction group comprised in the second control program in the predetermined execution order in accordance with the virtual time,
   calculating, by the second controller emulator, a first execution time necessary for executing the first instruction comprised in the second control program in accordance with measurement using the virtual time and executing the first instruction;
   executing, by the first controller emulator, the plurality of instructions repeatedly during the first execution time;
   transmitting, by the second controller emulator, a completion of the first instruction to the first control emulator in response to the first instruction having been completed;
   calculating, by the second control emulator after the second controller emulator transmits the completion of the first instruction to the first controller emulator, a second execution time necessary which is different from the first execution time for executing the second instruction comprised in the second control program in accordance with measurement using the virtual time and executing the second instruction;
   executing, by the first controller emulator repeatedly, the plurality of instructions during the second execution time; and
   transmitting, by the second controller emulator, a completion of the second instruction to the first control emulator in response to the second instruction having been completed.

8. A non-transitory computer-readable recording medium comprising an information processing program executed by a computer, the information processing program causing the computer to execute functions comprising:
   simulating, by a first actuator emulator, a behavior of a first drive apparatus that drives a first control target;
   simulating, by a second actuator emulator, a behavior of a second drive apparatus that drives a second control target;
   storing, by a storage device, a first control program written in a cyclic execution type programming language that comprises a first instruction group having a plurality of instructions to be executed in a cyclical manner within a predetermined first control period with respect to the first actuator emulator,
   storing, by the storage device, a second control program written in a sequential execution type programming language that comprises a second instruction group to be executed in a predetermined execution order and comprises a first instruction and a second instruction with respect to the second actuator emulator;
   generating, by a timer, a virtual time to be used by a first control emulator for executing repeatedly the first instruction group comprised in the first control program in each of the predetermined first control period in accordance with measurement using the virtual time and to be used by a second control emulator for executing sequentially the second instruction group comprised in the second control program in the predetermined execution order in accordance with the virtual time,
   calculating, by the second controller emulator, a first execution time necessary for executing the first instruction comprised in the second control program in accordance with measurement using the virtual time and executing the first instruction;
   executing, by the first controller emulator, the plurality of instructions repeatedly during the first execution time;
   transmitting, by the second controller emulator, a completion of the first instruction to the first control emulator in response to the first instruction having been completed;
   calculating, by the second control emulator after the second controller emulator transmits the completion of the first instruction to the first controller emulator, a second execution time necessary which is different from the first execution time for executing the second instruction comprised in the second control program in accordance with measurement using the virtual time and executing the second instruction;
   executing, by the first controller emulator repeatedly, the plurality of instructions during the second execution time; and
   transmitting, by the second controller emulator, a completion of the second instruction to the first control emulator in response to the second instruction having been completed.

9. An information processing device of claim 1, wherein after the second controller emulator transmits the completion of the first instruction to the first control emulator claim 1 further comprising:
   the first control emulator receives the completion of the first instruction, interprets the second instruction for the second emulator, and calculates the second execution time necessary for executing the second instruction so as to repeatedly executes the plurality of instructions during the second execution time.

* * * * *